United States Patent
Tsai

(10) Patent No.: US 6,415,881 B1
(45) Date of Patent: Jul. 9, 2002

(54) RETAINING DEVICE OF SCOOTER BATTERY SET

(76) Inventor: Shui-Te Tsai, No. 12, Lane 441, Pu Na Street, Chang Hua (TW)

( * ) Notice: Subject to any disclaimer, the term of this patent is extended or adjusted under 35 U.S.C. 154(b) by 0 days.

(21) Appl. No.: 09/734,576

(22) Filed: Dec. 13, 2000

(51) Int. Cl.⁷ .............................................. B60R 16/04
(52) U.S. Cl. ...................... 180/68.5; 16/429; 180/220; 429/100
(58) Field of Search ................................ 180/181, 220, 180/68.5, 65.1; 16/110.1, 405, 429; 429/96, 100

(56) References Cited

U.S. PATENT DOCUMENTS

| | | | | |
|---|---|---|---|---|
| 5,443,926 A | * | 8/1995 | Holland et al. ............ | 180/68.5 |
| 6,016,882 A | * | 1/2000 | Ishikawa .................... | 180/205 |
| 6,035,561 A | * | 3/2000 | Paytas et al. .............. | 180/68.5 |
| 6,148,944 A | * | 11/2000 | Adomi et al. .............. | 180/220 |
| 6,276,479 B1 | * | 8/2001 | Suzuki et al. .............. | 180/220 |
| 6,285,160 B1 | * | 9/2001 | Tsai ........................... | 180/68.5 |
| 6,290,014 B1 | * | 9/2001 | MacCready, Jr. .......... | 180/220 |

* cited by examiner

Primary Examiner—Michael Mar
(74) Attorney, Agent, or Firm—Browdy and Neimark, P.L.L.C.

(57) ABSTRACT

A retaining device of a scooter battery set comprises a support frame mounted on the scooter and provided with a support rod, and insertion portion, and a retaining portion, a battery box having at least one insertion portion, a hanging seat connected with the battery box and provided with a hanging portion, a retaining member pivoted to the hanging seat and provided with a wrenching portion and a retaining portion, and a handle set fastened with the insertion portion of the battery box and provided with a handle. As the handle is lifted or pressed downward, the retaining member is actuated to catch or separate from the retaining portion of the support frame.

13 Claims, 7 Drawing Sheets

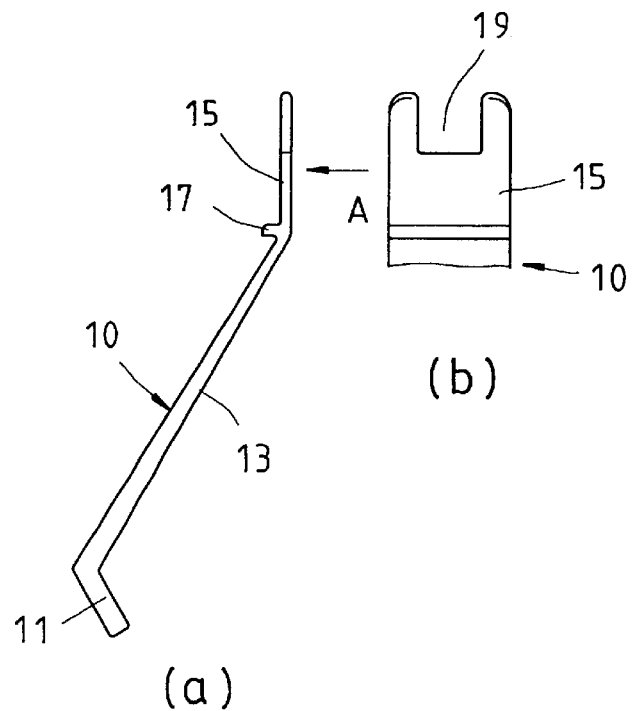
FIG. 4
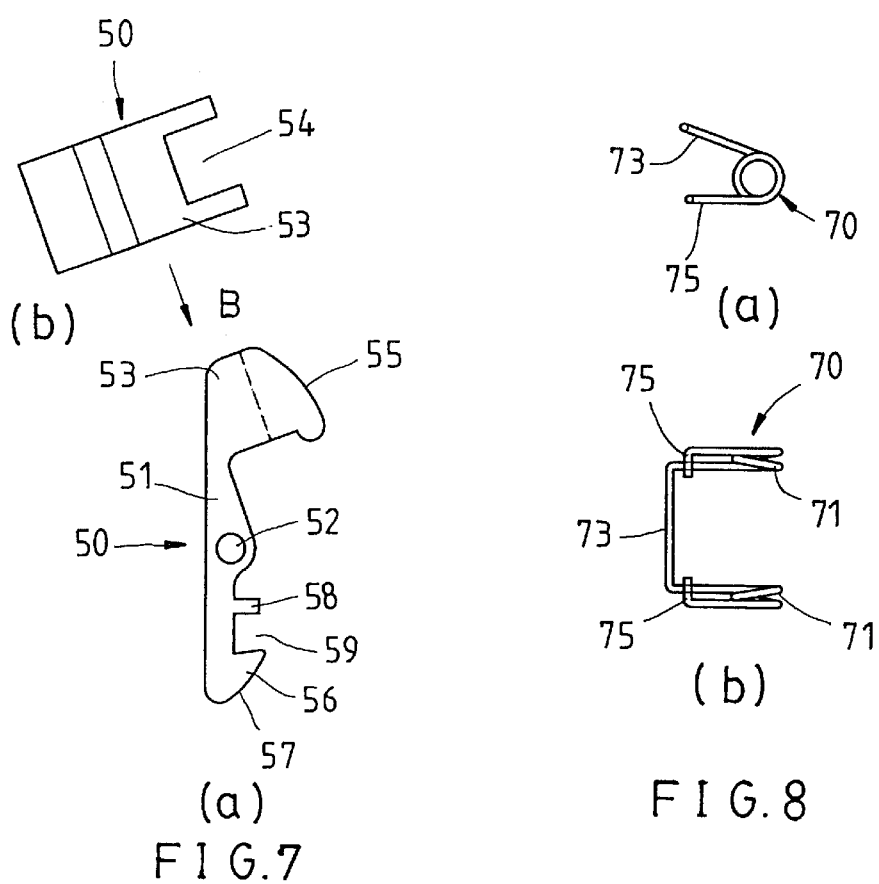
FIG. 7
FIG. 8

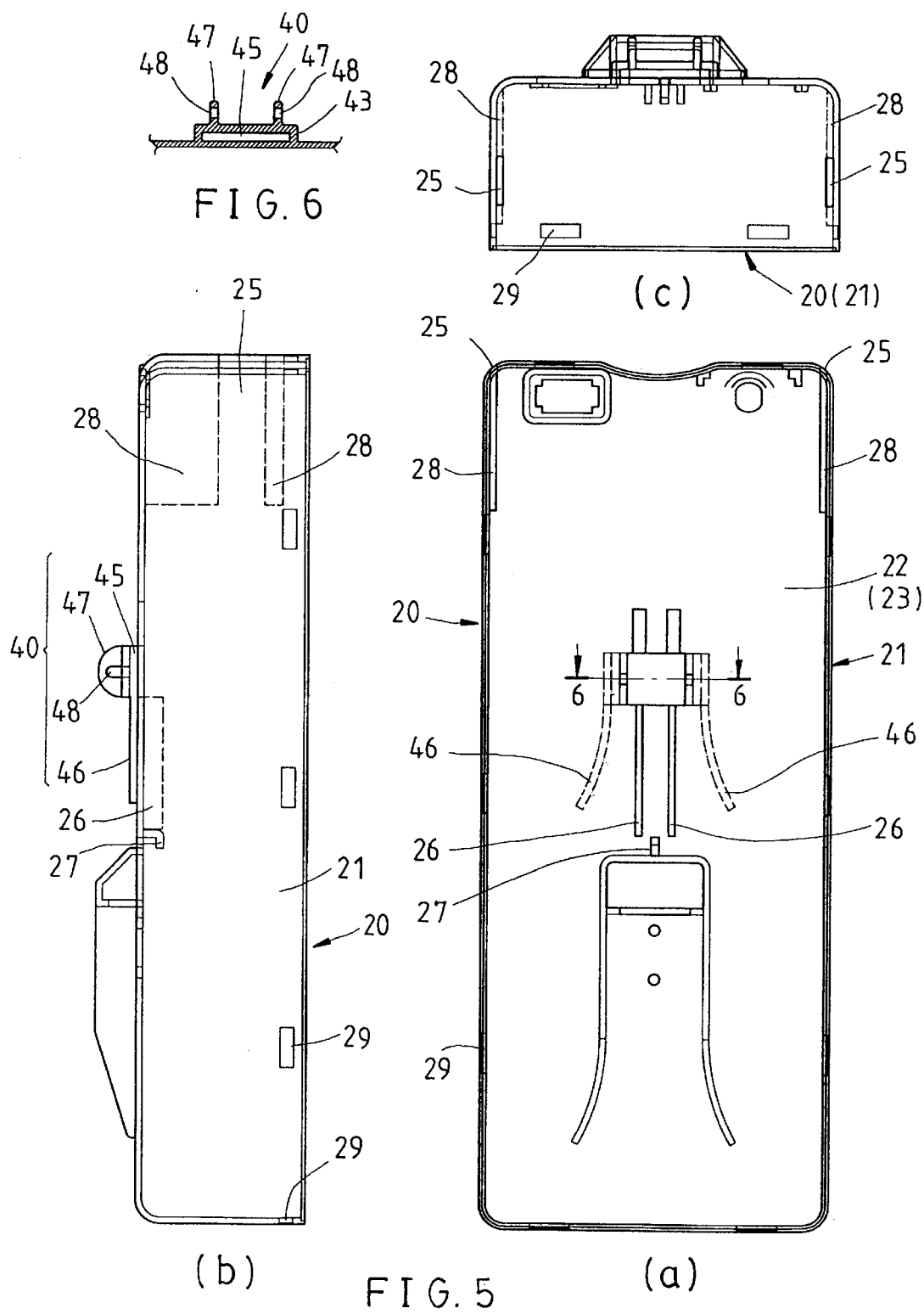

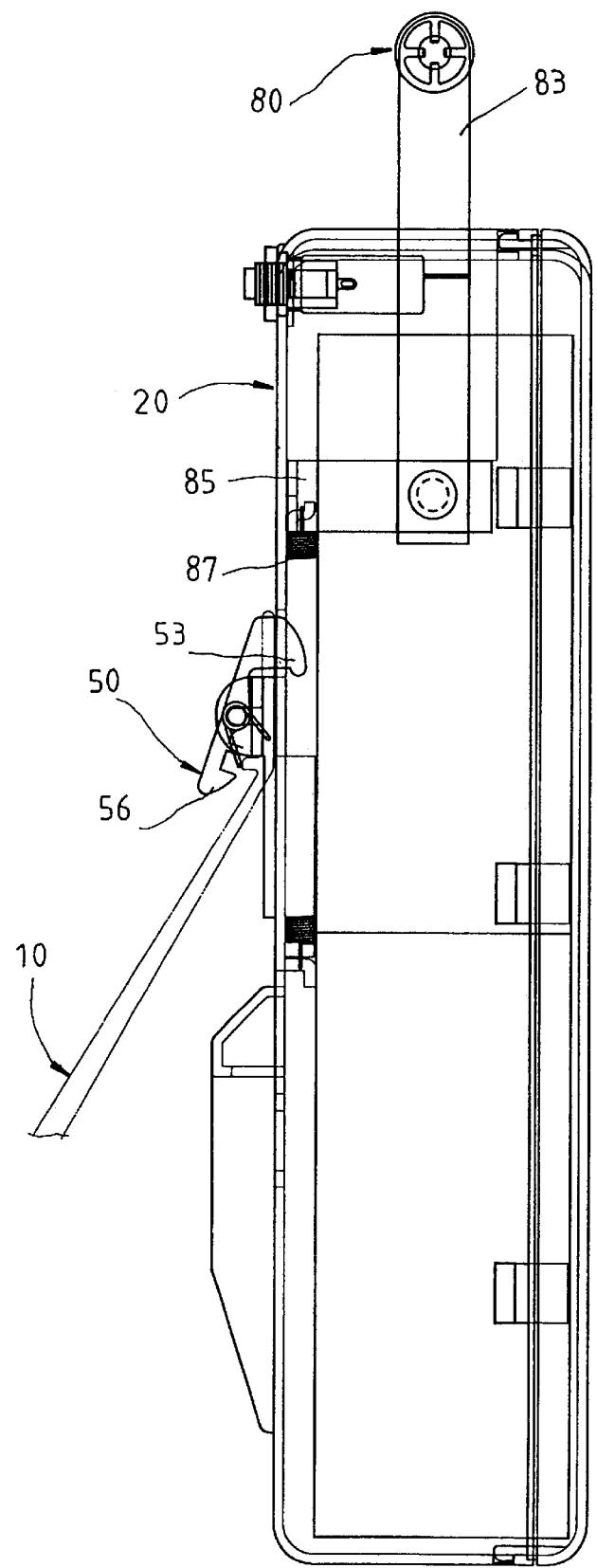
F I G. 11

RETAINING DEVICE OF SCOOTER BATTERY SET

FIELD OF THE INVENTION

The present invention relates generally to a scooter battery set, and more particularly to a retaining device of the scooter battery set.

BACKGROUND OF THE INVENTION

The conventional electric scooter has a battery set which is retained by a foldable support frame or a plurality of retaining straps in conjunction with the retaining hooks. Such conventional retaining means as described above are primitive in design at best.

SUMMARY OF THE INVENTION

The primary objective of the present invention is to provide a well-designed device for retaining a battery set of an electric scooter. The device is effective and easy to use.

The battery retaining device of the present invention is formed of a support frame, a retaining member, and a handle. The support frame is mounted on a predetermined position of an electric scooter and is provided with an insertion portion and a retaining portion. The battery set has a battery box which is retained by the insertion portion of the support frame. The retaining member is pivotally fastened with the battery box. The handle is fastened with the battery set such that the handle is capable of causing the retaining member to engage or disengage the retaining portion of the support frame.

BRIEF DESCRIPTION OF THE DRAWINGS

FIG. 4a shows a side view of the support frame of the present invention.

FIG. 4b shows an auxiliary view taken along the A direction as shown in FIG. 4a.

FIG. 5a shows a front view of the bottom casing of the present invention.

FIG. 5b is a side view of the present invention as shown in FIG. 5a.

FIG. 5c is a top view of the present invention as shown in FIG. 5a.

FIG. 6 shows a sectional view taken along the direction indicated by a line 6—6 as shown in FIG. 5a.

FIG. 7a shows a side view of the retaining member of the present invention.

FIG. 7b shows an auxiliary view taken along the B direction as shown in FIG. 7a.

FIG. 8a shows a side view of a torsion spring of the present invention.

FIG. 8b shows a bottom view of the present invention as shown in FIG. 8a.

FIG. 9a shows a schematic view of a stop member of the present invention.

FIG. 9b shows a side view of the present invention as shown in FIG. 9a.

FIG. 10b shows a side view of the present invention as shown in FIG. 10a.

FIG. 11 shows a schematic view of the present invention at work.

DETAILED DESCRIPTION OF THE INVENTION

Figure 1:
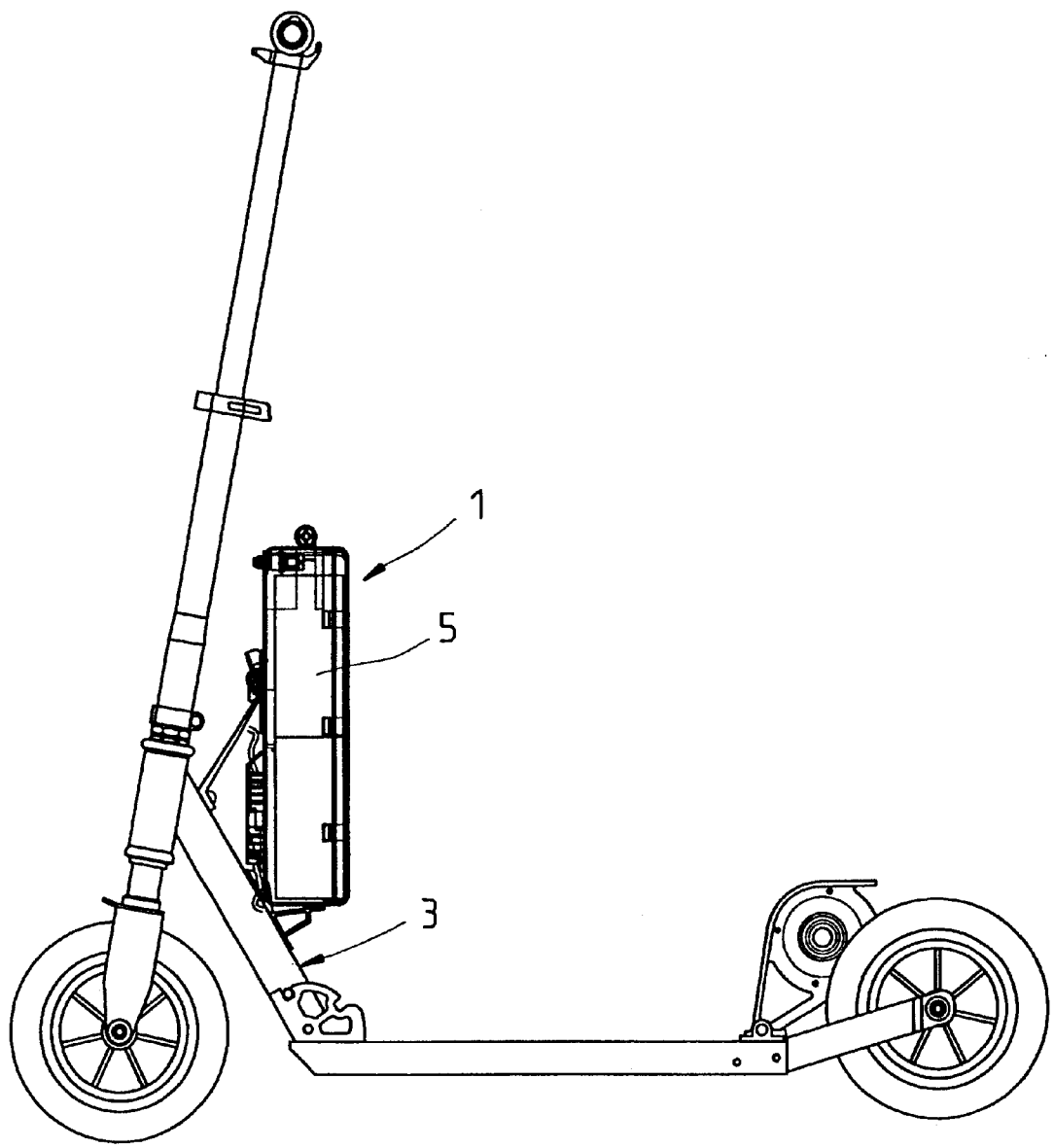
FIG. 1 shows a schematic side view of the present invention.

As shown in FIGS. 1–10, a battery retaining device 1 embodied in the present invention is mounted on a folding device 3 of an electric scooter for holding a plurality of batteries 5. The retaining device 1 comprises a support frame 10, a bottom casing 20, an upper cover 30, a hanging seat 40, a retaining member 50, a torsion spring 70, and a handle set 80.

The support frame 10 has a fastening portion 11, a rod portion 13, an insertion portion 15, and a retaining portion 17. The support frame 10 is fastened with the folding device 3 by the fastening portion 11. The insertion portion 15 is located at the top end of the rod portion 13 and is provided with a cut 19. The retaining portion 17 is located at the lower portion of the insertion portion 15.

The bottom casing 20 has a body 21 which is provided with a receiving slot 22 for accommodating a plurality of batteries 5, an opening 23, two insertion holes 25, two protective pieces 26, a hooked portion 27, two stop portions 28, and a plurality of retaining portions 29.

The upper cover 30 has a body 31 which is provided with a plurality of retaining portions 33 to retain the retaining portions 29 of the bottom casing 20. The upper cover 30 and the bottom casing 20 form a closed battery box.

The hanging seat 40 is integrally made with the bottom casing 20 and is provided with a frame portion 43 having a hanging hole 45 for receiving the insertion portion 15 of the support frame 10. The frame portion 43 is provided with two guide rails 46 and two pivoting lugs 47, with each lug 47 having a pivoting hole 48.

The retaining member 50 has a pivoting portion 51 which is provided with a pivoting hole 52. The retaining member 50 further has a wrenching portion 53 which is provided with a cut 54, two arcuate surfaces 55, a retaining hook 56 with an arcuate surface 57, a stop piece 58 and a retaining groove 59 in which the retaining portion 17 of the Support frame 10 is retained.

The torsion spring 70 has two coil portions 71 for receiving a pivot 60, a middle press portion 73 for disposing the retaining member 50, and two side press portions 75 for disposing the hanging seat 40.

The handle set 80 has a grip rod 81 which is provided at both ends with a threaded hole 813. The handle set 80 further has two pull pieces 83 which are inserted into the insertion holes 25 of the bottom casing 20. Each pull piece 83 is provided with a pivoting hole 833 for receiving a rivet 84 which is engaged with the threaded hole 813 of the grip rod 81. Each pull piece 83 is provided with a retaining groove 835 forming a pivoting hole 837. The handle set 80 further has a stop member 85 which is provided with a bottom plate 851 and two side plates 853, with each side plate 853 forming a retaining groove 856 for retaining the retaining groove 835 of the pull piece 83, a hooked portion 857 and a pivoting hole 859. The handle set 80 further has a tension spring 87 which is engaged at one end thereof with the hooked portion 857 of the stop member 85, and at other end thereof with the hooked portion of the bottom casing 20.

Figure 2:
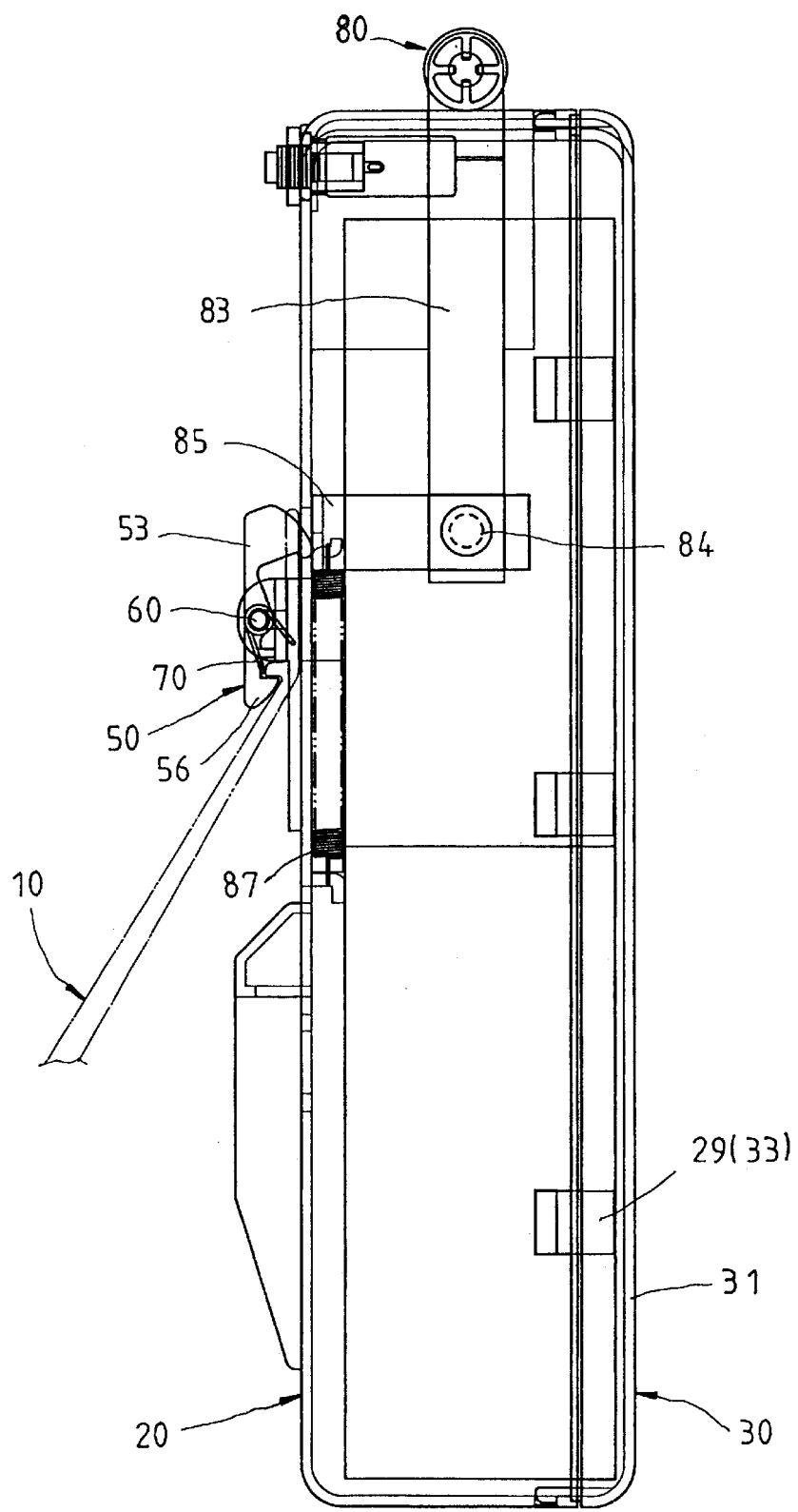
FIG. 2 shows an enlarged schematic side view of the present invention at work.
Figure 3:
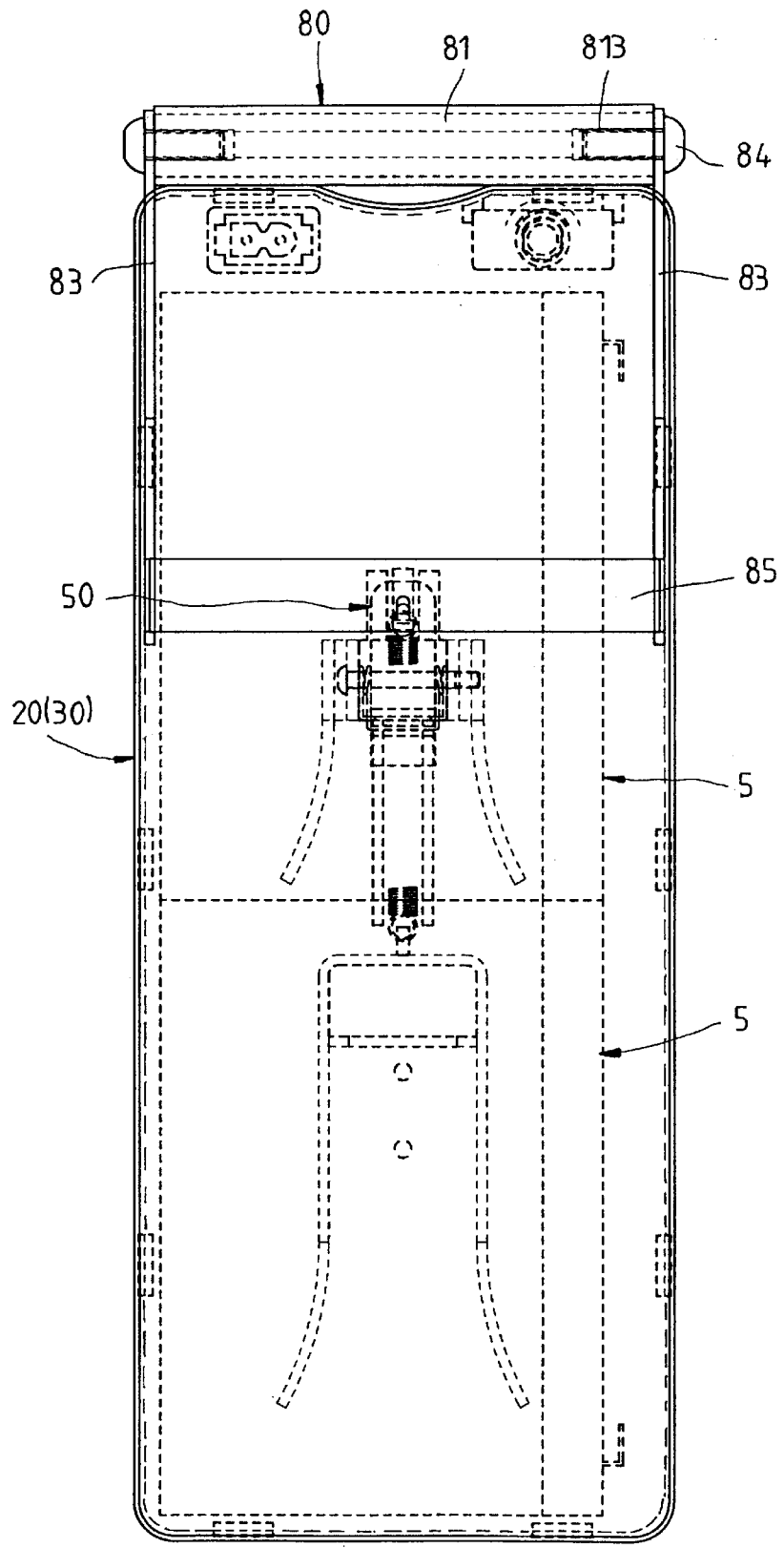
FIG. 3 shows a schematic right view of the present invention as shown in FIG. 2.
Figure 9:
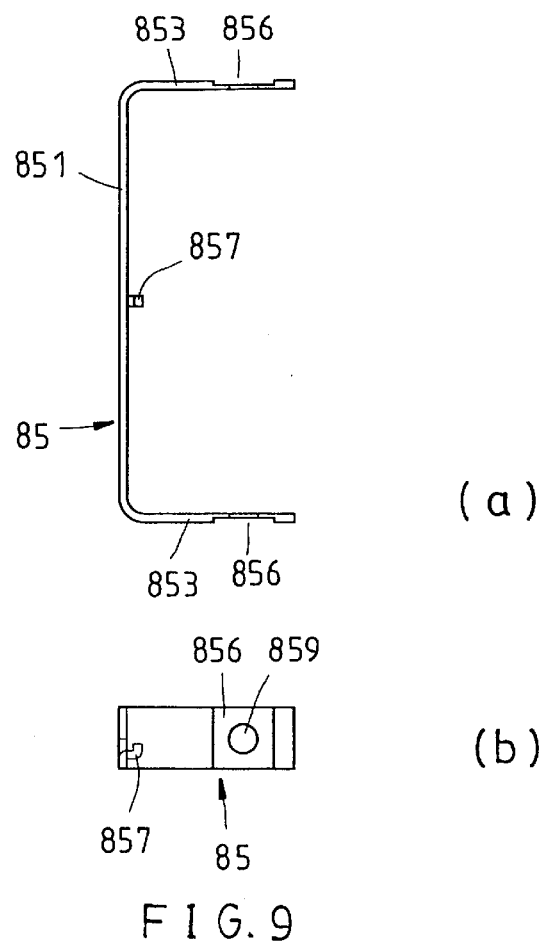
Figure 10:
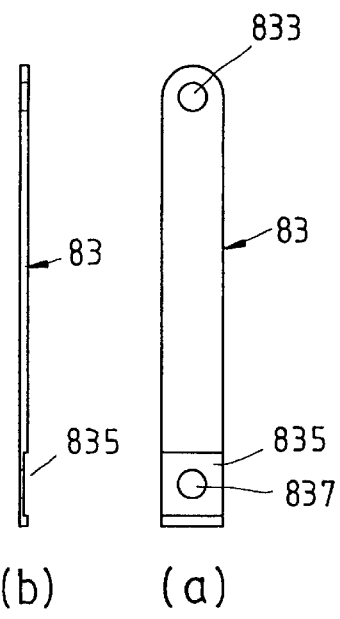

As illustrated in FIGS. 2 and 3, the insertion portion 15 of the support frame 10 is inserted into the hanging hole 45 of the bottom casing 20. The retaining member 50 is exerted on by the spring force of the torsion spring 70 to remain in the open state. The handle set 80 is pressed downward to cause the stop member 85 to push the arcuate surface 55 of the wrenching portion 53 of the retaining member 50 to swivel, thereby causing the retaining groove 59 of the retaining member 50 to be retained by the retaining portion 17 of the support frame 10.

As shown in FIG. 11, the grip rod 81 of the handle set 80 is lifted to actuate the pull piece 83 and the stop member 85 to move upward. The retaining member 50 is forced by the torsion spring 70 to swivel toward another side such that the retaining hook 56 moves away from the retaining portion 17 of the support frame 10. As the stop member 85 is stopped by the stop portion 28 of the bottom casing 20, the battery box is lifted by the handle set 80.

The embodiment of the present invention described above is to be regarded in all respects as being merely illustrative and not restrictive. Accordingly, the present invention may be embodied in other specific forms without deviating from the sprit thereof. The present invention is therefore to be limited only by the scopes of the following appended claims.

What is claimed is:

1. A device for retaining a battery set of an electric scooter, said device comprising:

a support frame mounted on the frame of a scooter and formed of a support rod, an insertable portion, and a retaining portion;

a battery box for housing batteries and having receiving means for receiving said insertable portion;

a hanging seat connected with said battery box and provided with a hanging portion fitted with said insertable portion of said support frame;

a retaining member pivoted to said hanging seat and provided with a wrenching portion, and a retaining portion corresponding in location to said retaining portion of said support frame; and a handle set movably engaged with said receiving means of said battery box and provided with a handle, and a stop member whereby said handle set is lifted or pressed downward to cause said retaining member to catch or separate from said retaining portion of said frame.

2. The device as defined in claim 1, wherein said retaining member is provided by a torsion spring with a spring force.

3. The device as defined in claim 1, wherein said retaining portion of said support frame is a protruded edge.

4. The device as defined in claim 1, wherein said retaining portion of said retaining member is of a hooked construction.

5. The device as defined in claim 1, wherein said retaining member is provided with a groove for retaining said retaining portion of said support frame.

6. The device as defined in claim 1, wherein said retaining portion of said retaining member is provided with an arcuate surface for joining with said retaining portion of said support frame.

7. The device as defined in claim 1, wherein said hanging seat is provided with two pivoting lugs for pivoting said retaining member.

8. The device as defined in claim 1, wherein said battery box is formed of a bottom casing and an upper cover.

9. The device as defined in claim 1, wherein said battery box is provided with a hooked portion; wherein said handle set is provided with a hooked portion and a tension spring.

10. The device as defined in claim 1, wherein said receiving means comprises two insertion holes.

11. The device as defined in claim 1, wherein said receiving means of said battery box is an insertion hole; wherein said handle set is provided with a pull piece corresponding in location to said insertion hole of said battery box.

12. The device as defined in claim 1, wherein said hanging seat is integrally made with said battery box.

13. The device as defined in claim 1, wherein said insertable portion of said support frame is provided in a center part thereof with a cut for disposing said retaining member.

* * * * *